Patented Nov. 25, 1930

1,783,168

UNITED STATES PATENT OFFICE

HERMAN ALEXANDER BRUSON, OF GERMANTOWN, PENNSYLVANIA, ASSIGNOR TO THE RESINOUS PRODUCTS & CHEMICAL COMPANY, A CORPORATION OF DELAWARE

CONDENSATION PRODUCT AND PROCESS OF PREPARING SAME

No Drawing.  Application filed September 25, 1930. Serial No. 484,475.

This application is a continuation in part of Serial No. 433,183 filed March 4th, 1930, and relates to mixed esters of polyhydric alcohols, the acid components of which are aliphatic dibasic acids containing at least six carbon atoms in a normal straight chain, particularly sebacic acid; and acids obtained from the hydrolysis of glycerides present in natural fatty oils.

It is known that mixed esters may be obtained by heating polyhydric alcohols such as glycerol with acids derived from the hydrolysis of natural fatty oils in conjunction with polybasic acids. The polybasic acids which have heretofore been used for this purpose are phthalic, succinic, malic, maleic, tartaric, camphoric, citric and the like. (Howell, U. S. Pat. 1,098,728 (1914); Arsem, U. S. Pat. 1,098,777 (1914); Dawson, U. S. Pat. 1,141,944 (1915); Weber, U. S. Pat. 1,690,515 (1928).)

All of these products possess certain undesirable properties when used as protective coatings where flexibility, elasticity and adhesion are essential, as for example on leather, rubber, paper and the like; in that they become progressively harder and more brittle upon ageing, thereby losing to a very considerable degree their original flexibility and elasticity.

I have discovered however that all of these disadvantages may be eliminated and new rubber-like compositions having greater elasticity, flexibility and freedom from progressive embrittlement upon ageing, may be obtained, by using in place of the polybasic acids previously employed, certain aliphatic, dibasic acids which contain at least six carbon atoms in a normal straight chain, namely, any one of the following acids:

Adipic acid HOOC—$CH_2$—$CH_2$—$CH_2$—$CH_2$—COOH
Pimelic acid HOOC—$CH_2$—$CH_2$—$CH_2$—$CH_2$—$CH_2$—COOH
Suberic acid HOOC—$CH_2$—$CH_2$—$CH_2$—$CH_2$—$CH_2$—$CH_2$—COOH
Azelaic acid HOOC—$CH_2$—$CH_2$—$CH_2$—$CH_2$—$CH_2$—$CH_2$—$CH_2$—COOH
Sebacic acid HOOC—$CH_2$—$CH_2$—$CH_2$—$CH_2$—$CH_2$—$CH_2$—$CH_2$—$CH_2$—COOH or mixtures thereof.

In particular, I have found that sebacic acid in combination with polyhydric alcohols, notably glycerol, gives soft, rubber-like masses as described in my co-pending patent application, (Serial No. 311,256 filed Oct. 8, 1928), which in combination with acids obtained from the hydrolysis of fatty oil glycerides, form mixed esters possessing greater elasticity, flexibility, adhesion, and freedom from progressive embrittlement upon ageing, than any of the mixed esters heretofore described.

In practicing my invention it has been found desirable to prepare mixed esters from adipic acid and its higher homologues, including sebacic acid, as follows:

Example 1

Equi-molecular quantities, namely, 40.4 grams sebacic acid, 56.4 gr. oleic acid and 19 gr. glycerol are mixed together and heated in an open vessel with stirring, first at 170° C. for four hours and finally at 230° C. for 2 hours. A very viscous sirup is obtained, which is soluble in toluene, butyl acetate, or butyl alcohol. The sebacic acid may be replaced with 29.2 gr. adipic acid if desired.

Example 2

Equi-molecular quantities, namely, 40.4 gr. sebacic acid, 56.5 gr. stearic acid and 19 gr. glycerol are heated together at 230° C. for 5¼ hours. The product is a tough, rubber-like plastic solid, soluble in toluol, gasoline and butyl acetate. The sebacic acid may be replaced with 37.6 gr. azelaic acid, if desired.

Example 3

60.6 gr. sebacic acid, 59.6 gr. of the fatty acid mixture resulting from the hydrolysis of raw castor oil by steam or alkali and known technically as "castor oil fatty acids", and 30.7 grams glycerol are heated together at 170–175° C. for 9 hours with stirring. A thick, sirupy liquid is obtained, which upon prolonged heating forms a rubber-like mass.

Example 4

40.4 gr. sebacic acid, 19 grams glycerol and 56 gr. of the crude mixture of acids obtained from the hydrolysis of raw or bodied linseed oil and known technically as "linseed oil fatty acids", are heated 1½ hrs. at 230° C. in an atmosphere of nitrogen or other non-oxidizing gas with stirring. A viscous sirupy resin is obtained which upon further heating goes over into an insoluble, rubbery mass.

*Example 5*

184 grams glycerol, 404 grams sebacic acid, 280 grams linseed oil fatty acids (crude mixture) and 130 grams of raw China wood oil are heated in an atmosphere of carbon dioxide at 190° C. with stirring until a viscous, rubbery material soluble in toluol is formed.

*Example 6*

184 grams glycerol, 404 grams sebacic acid, 280 grams linseed oil fatty acids and 100 grams of raw linseed oil are heated together at 190–200° C. in an atmosphere of carbon dioxide with stirring until a viscous rubbery mass, soluble in toluene is obtained. This requires about 4 hours.

*Example 7*

1 molecular equivalent of sebacic acid, 1 molecular equivalent of glycerol, 280 grams of the fatty acid mixture obtained by hydrolyzing China wood oil, are heated together at 185–190° C. with stirring until a rubbery resin soluble in toluol is obtained. Further heating converts this material into a rubberlike mass which is no longer soluble in organic solvents.

In an analogous manner, adipic acid or its higher homologues having a normal straight chain, namely pimelic, suberic or azelaic acids, or mixtures thereof, may be heated with the individual purified fatty acids or with the crude mixture of fatty acids resulting from the hydrolysis of fatty oil glycerides; namely oleic, ricinoleic, palmitic, stearic, elaeostearic, linoleic, linolenic acids, and drying oil fatty acids, alone or mixed with unhydrolyzed oily glycerides, together with the calculated quantity of glycerol or other polyhydric alcohol required to completely esterify both or all of the free acids present.

It is understood herein that the expressions "linseed oil fatty acids," "China wood oil fatty acids," "castor oil fatty acids," "drying oil fatty acids," etc., refer to the commercial mixed fatty acids obtained from the corresponding oils by hydrolysis with steam or by other means. The term "drying oil fatty acids" as used herein signifies the acid mixture resulting from the hydrolysis of the commercial drying oils or semi-drying oils such as linseed, perilla, soya-bean, walnut, tung, rape, and the like, without especial purification.

The products obtained are viscous liquids, or tough solids, soluble in toluol. Those prepared from non-drying oil acids, such as oleic or ricinoleic never dry when exposed to the air in the form of a film but retain their original flexibility and elasticity for much longer periods than analogous resins prepared from the previously mentioned polybasic acids heretofore employed.

The resins prepared from drying oil acids as described above dry to soft, adherent, elastic films which do not become hard and brittle on long exposure to the air.

These resins possess unique qualities which makes them especially desirable as coating materials for leather, felt, paper, rubber and thin sheet metal where utmost flexibility and adhesion are desired. They are particularly desirable in nitrocellulose lacquers as plasticizing agents.

It is apparent that many deviations from the procedure described above are possible, without departing from the scope of the invention. For example, the quantities and temperatures that may be used can be varied within wide limits and similar products obtained. We do not wish to be limited therefore to any particular molecular ratios of the components, or temperatures for carrying out the reaction. Furthermore unhydrolyzed fatty glycerides may be added to the reaction mixture in order to obtain different viscosities of the final batch of resin.

What I claim as new is:

1. A composition of matter comprising the condensation product of sebacic acid, linseed oil fatty acids and glycerol.

2. A composition of matter comprising the condensation product of sebacic acid, castor oil fatty acids, and glycerol.

3. A composition of matter comprising the condensation product of sebacic acid, China wood oil fatty acids and glycerol.

4. A composition of matter comprising the condensation product of sebacic acid an aliphatic monobasic acid derived from the hydrolysis of a natural fatty oil glyceride and glycerol.

5. A composition of matter comprising the condensation product of sebacic acid, an aliphatic monobasic acid derived from the hydrolysis of a natural fatty oil glyceride, and a polyhydric alcohol.

6. A composition of matter comprising the condensation product of an acid of the general formula $$(CH_2)_n \begin{matrix} COOH \\ COOH \end{matrix}$$

where $n$ is a whole number between 4 and 8 inclusive, an aliphatic monobasic acid derived from the hydrolysis of a natural fatty oil glyceride, and a polyhydric alcohol.

7. A composition of matter comprising the condensation product of sebacic acid, an aliphatic monobasic acid derived from the hydrolysis of a natural fatty oil glyceride, glycerol, and unhydrolyzed fatty oil glycerides.

8. A composition of matter comprising the condensation product of an acid of the general formula

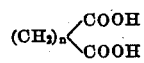

where $n$ is a whole number between 4 and 8 inclusive an aliphatic monobasic acid derived from the hydrolysis of a natural fatty oil glyceride, a polyhydric alcohol, and unhydrolyzed fatty oil glycerides.

9. A process for preparing a resinous mass which comprises heating to reaction temperature sebacic acid, linseed oil fatty acids, and glycerol.

10. A process for preparing a resinous mass which comprises heating to reaction temperature sebacic acid, castor oil fatty acids, and glycerol.

11. A process for preparing a resin which comprises heating to reaction temperature sebacic acid, China wood oil fatty acids, and glycerol.

12. A process for preparing a resinous mass which comprises heating to reaction temperature an acid of the general formula

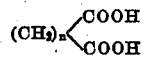

where $n$ is a whole number between 4 and 8 inclusive, an aliphatic monobasic acid derived from the hydrolysis of a natural fatty oil glyceride, a polyhydric alcohol and unhydrolyzed fatty oil glycerides.

In testimony whereof I affix my signature.

HERMAN ALEXANDER BRUSON.